United States Patent [19]

Takada et al.

[11] Patent Number: 5,379,705
[45] Date of Patent: Jan. 10, 1995

[54] FLUIDIZED-BED INCINERATOR

[75] Inventors: Tomoaki Takada; Kazuo Tsutsumi; Tadashi Katahata, all of Kobe; Toshinori Muraoka, Akashi, all of Japan

[73] Assignee: Kawasaki Jukogyo Kabushiki Kaisha, Hyogo, Japan

[21] Appl. No.: 149,280

[22] Filed: Nov. 9, 1993

[30] Foreign Application Priority Data

| Nov. 11, 1992 | [JP] | Japan | 4-325920 |
| Mar. 17, 1993 | [JP] | Japan | 5-082769 |
| Jun. 28, 1993 | [JP] | Japan | 5-185442 |
| Jun. 28, 1993 | [JP] | Japan | 5-185443 |
| Jun. 28, 1993 | [JP] | Japan | 5-185444 |

[51] Int. Cl.$^6$ ............................................. F23G 5/00
[52] U.S. Cl. ...................... 110/245; 110/229; 422/142
[58] Field of Search ............... 110/245, 229; 122/4 D; 422/142

[56] References Cited

U.S. PATENT DOCUMENTS

| 4,435,148 | 3/1984 | Moss | 110/245 X |
| 4,682,567 | 7/1987 | Garcia-Mallol et al. | 122/4 D |
| 4,815,418 | 3/1989 | Maeda et al. | 122/4 D |
| 4,823,712 | 4/1989 | Wormer | 110/245 |

Primary Examiner—Edward G. Favors
Attorney, Agent, or Firm—Oliff & Berridge

[57] ABSTRACT

Waste materials including chlorine compounds are charged into a fluidized-bed gasification furnace having a first fluidized bed of which fluidizing medium comprises CaO. HCl produced from the waste materials is reacted with CaO which is the fluidizing medium and changed into $CaCl_2$, and then discharged from a discharge pipe together with unburned materials. Gas generated as a result of the above-described reaction flows together with $CaCO_3$, which is supplied into a second fluidized bed of a fluidized-bed combustion furnace located above, and are burned within the second fluidized bed. CaO is supplied from the second fluidized bed into the first fluidized bed via a supply pipe. In this manner, HCl produced from the waste materials is effectively removed.

27 Claims, 13 Drawing Sheets

FLUIDIZED-BED INCINERATOR

BACKGROUND OF THE INVENTION

The present invention relates to a desairing fluidized-bed incinerator capable of removing hydrogen chloride (HCl) generated when waste materials containing chlorine compounds are burned.

Recently, the rate of plastics contained in rubbish or waste materials is increasing. With this trend, more use is being made of fluidized-bed incinerators suitable for combustion of plastics than stoker furnaces and the like.

In conventional fluidized-bed incinerators, hydrogen chloride contained in combustion exhaust gases have been removed by spraying quick lime (CaO) and slaked lime ($Ca(OH)_2$) into the exhaust gases after combustion to form calcium chloride ($CaCl_2$) and by collecting the $CaCl_2$ by a bag filter.

In order to remove hydrogen chloride in the combustion exhaust gases, a temperature lower than the combustion temperature must be used. For this reason, quick lime or slaked lime is sprayed into the exhaust gases as mentioned above, and water is also sprayed therein to lower the temperature of exhaust gases.

Such a method as described above employed in the conventional system for removing hydrogen chloride, gives rise to problems such as large energy losses, large water requirements and increased exhaust gases.

Further, in the case of using a power generation system making use of heat generated from waste materials from a viewpoint of effective utilization of energy, a problem arises in that when hydrogen chloride is present in the exhaust gases at a high temperature region, heat transfer tubes in the power generation system suffer corrosion.

SUMMARY OF THE INVENTION

The present invention has been made in order to overcome the above-described problems, and the primary object of the present invention is to provide an incinerator which can effectively remove hydrogen chloride within the incinerator without spraying water and which can recover heat without corroding heat transfer tubes at a high temperature region.

According to the present invention, there is provided an incinerator for waste materials comprising, in order to incinerate waste materials including chlorine compounds, a fluidized-bed gasification furnace including a first fluidized bed made of at least a fluidizing medium of an alkaline metal oxide, means for supplying air into the first fluidized bed, means for supplying waste materials including chlorine compounds into the first fluidized bed, and means for discharging unburned materials in the waste materials out of the first fluidized bed, whereby the waste materials are gasified in the first fluidized. bed and generated hydrogen chloride is changed into a salt; and a fluidized-bed combustion furnace connected to a downstream side of said gasification furnace so as to receive gases produced in the gasification furnace and having a second fluidized bed for burning said gases.

The waste materials containing chlorine compounds charged into the first fluidized bed of the fluidized-bed gasification furnace are fluidized together with the fluidizing medium which is fluidized by primary air fed into the first fluidized bed. At least a part of the fluidizing medium of the first fluidized bed comprises an alkaline metal oxide. Hydrogen chloride generated from the waste materials is caused to react with the alkaline metal oxide to form an alkaline metal chloride, and chlorine is made into a solid material. The alkaline metal chloride is discarded together with non-combustible materials in the waste materials. Gases generated by the aforementioned reaction are supplied into the fluidized bed combustion furnace and burned by secondary air within the second fluidized bed therein.

Within the first fluided bed, the air ratio is low and or the order of 0.2 to 0.5, and most hydrocarbons are gasified not by combustion reaction but by gasification reaction. Therefore, the quantity of heat generated within the first fluidized bed is small so that it is possible to maintain the fluidized bed temperature in a relatively low temperature range (from 500° to 650° C.) without spraying water to the fluidized bed. Further, the rate of the secondary air to the primary air is made high whereby hydrogen chloride generated in the first fluidized bed is considerably diluted (to approximately $\frac{1}{3}$ to $\frac{1}{4}$) by the secondary air within the second fluidized bed. For this reason, the hydrogen chloride concentration is suppressed to a value below 150 ppm or even below 100 ppm in the region downstream of the second fluidized bed where heat is recovered.

Preferred embodiments of the fluidized bed incinerator according to the present invention will now be described hereinbelow in detail with reference to the accompanying drawings.

DESCRIPTION OF THE PREFERRED EMBODIMENTS

Figure 1:
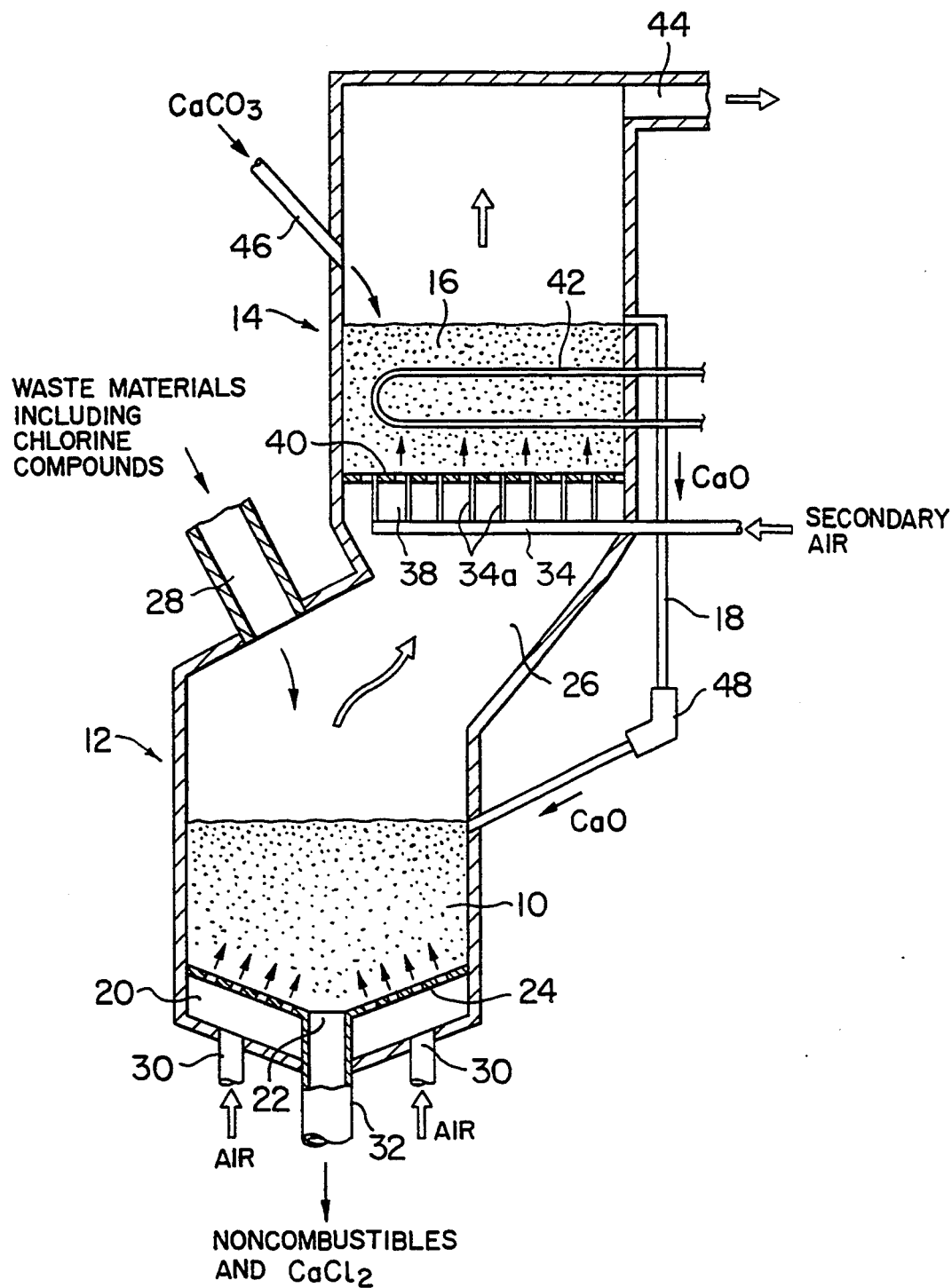
FIG. 1 is a vertical sectional view of one embodiment of the fluidized bed incinerator according to the present invention.

FIG. 1 shows an embodiment of a fluidized bed incinerator according to the present invention. In FIG. 1, reference numeral 12 designates a fluidized bed gasification furnace. The gasification furnace 12 is a furnace for gasifying chlorine compound containing waste materials charged therein, removing hydrogen chloride generated therein and discharging non-combustible materials and calcium chloride ($CaCl_2$) produced therein. The gasification furnace 12 is interiorly provided with a first fluidized bed 10 made of fluidizing medium. Quick lime (CaO) is a part or the whole of the fluidizing medium. In a case where quick lime (CaO) makes a part of the fluidizing medium, the remainder of the medium is sand or other particles.

A fluidized bed combustion furnace 14 is connected to the top of the fluidized bed gasification furnace 12. The fluidized bed combustion furnace 14 is a furnace for receiving gases generated in the fluidized bed gasification furnace 12 to burn the gases and recover heat.

The fluidized bed gasification furnace 12 is provided at a low portion thereof with an air pressure accumulation chamber 20 to introduce primary combustion air therein. A perforated air distributor plate 24 is provided above the accumulation chamber 20 and has a discharge port 22 for discharging non-combustible materials and calcium chloride ($CaCl_2$). The discharge port 22 may be provided centrally of the plate 24. The fluidized bed 10 is supported on the air pressure distributor plate 24. The gasification furnace 12 has an exhaust gas outlet 26 at the upper portion thereof and a waste material inlet 28 at an upper side thereof. Air supply conduits 30 are connected to the bottom of the gasification furnace 12. Reference numeral 32 designates a pipe for discharging non-combustible materials and calcium chloride ($CaCl_2$), connected to the discharge port 22.

The fluidized bed combustion furnace 14 has at its lower portion a secondary air supply pipe 34 with upwardly directed nozzles 34a for introducing a secondary air, and a perforated air distributor plate 40 is provided above the secondary air supply pipe 34. A second fluidized bed 16 made of quick lime (CaO) is supported on the air distributor plate 40, and heat transfer tubes 42 (only one is shown for the sake of simplicity) are embedded in the fluidized bed 16. Fluid such as cooling water is caused to flow into the heat transfer tubes 42. The combustion furnace 14 has an exhaust gas outlet 44 at an upper portion thereof and a pipe 46 for charging alkaline metal carbonate at an upper side thereof. An air pressure accumulation chamber 38 is connected to the exhaust gas outlet 26 of the fluidized bed gasification furnace 12.

The region of the fluidized bed 16 of the fluidized bed combustion furnace 14 is connected to the region of the fluidized bed 10 of the fluidized bed gasification furnace 12 through a pipe 18 for supplying alkaline metal oxide 18 provided with a valve 48.

Next, the operation of the above-described incinerator will be described. The fluidized bed 10 of the fluidized bed gasification furnace 12 is fluidized by air supplied from the conduits 30 and blown through the air distributor plate 24. Rubbish or waste materials containing chlorine compounds are charged through the waste material inlet 28 into the fluidized bed 10 of which quick lime makes a part or the whole of the fluidizing medium. The temperature of the fluidized bed 10 is set to 500° to 650° C. The waste materials charged into the furnace 12 are partly burned under a reducing atmosphere while its remainder is gasified. Since in the fluidized bed 10, a part or the whole of the fluidizing medium thereof is quick lime (CaO), hydrogen chloride generated from vinyl chloride and other chlorine containing plastics in the waste materials is formed into calcium chloride ($CaCl_2$) by the reaction of $2HCl + CaO \rightarrow CaCl_2 + H_2O$, and chlorine is changed into solid. The calcium chloride is drawn outside together with non-combustible materials through the discharge pipe 32.

Desalted combusted gas generated in the fluidized bed gasification furnace 12 passes through the air distributor plate 40 and is introduced into the fluidized bed 16 of the fluidized bed combustion furnace 14. The combusted gas is then mixed with the secondary air blown into the fluidized bed 16 from the secondary air supply pipe 34 and the nozzles 34a.

The temperature of the fluidized bed 16 is set to 800° to 900° C. A complete combustion of the gas mixed with the secondary air is carried out in the bed 16, and heat exchange between the fluidizing medium and the fluid in the heat transfer tubes 42 is carried out in the bed 16. Lime stone ($CaCO_3$) of a given amount is supplied through the charging pipe 46 into the fluidized bed 16 and calcined therein. A reaction of $CaCO_3 \rightarrow CaO + CO_2$ occurs in the bed 16. When the reaction proceeds at a temperature of from 800° to 900° C., quick lime having a high activity is produced. The quick lime is supplied into the fluidized bed 10 through the pipe 18 for supplying alkaline metal oxide, and a quick desalting reaction is carried out.

Accordingly, hydrogen chloride gas in the gas produced within the gasification furnace 12 is reduced to several tens to several ppm or less. The gas is oxidized in the fluidized bed 16, and even if the gas is caused to take a temperature of 800° to 900° C. as a result of complete combustion, only a very small amount of hydrogen chloride is present. Therefore, the heat exchange can be effected without corrosion of the heat transfer tubes 42.

On the other hand, a part of calcium chloride ($CaCl_2$) pulverized in the fluidized bed 10 passes through the fluidized bed 16 while being carried by the upflowing gas. At this time, the $CaCl_2$ is reacted with water in the gas to regenerate hydrogen chloride, but the hydrogen chloride is caused to react with CaO scattered in a bag filter (not shown) installed downstream with resultant desalting. The scattered CaO comes from within the fluidized bed 16 in which it is pulverized by fluidizing operation.

The following advantageous effects are obtained in the aforementioned incinerator.

(1) Two fluidized bed furnaces are arranged in series. A gasification furnace is provided at the lower stage, in which a part or the whole of fluidizing medium of a first fluidized bed comprises quick lime, and a combustion furnace is provided at the upper stage. With this arrangement, hydrogen chloride can be effectively removed within the furnace at the lower stage.

(2) Since the gases blown into a second fluidized bed of the upper stage is free from hydrogen chloride, corrosion of the heat transfer tubes in the second fluidized bed is considerably reduced.

(3) The temperature of the second fluidized bed can be elevated and heat transfer tubes can be placed in a high temperature area. It is therefore possible to constitute a highly efficient power-generation system or the like using water heated by the heat transfer tubes.

(4) Since in the second fluidized bed gas is burned at high temperature under the presence of stable oxygen, generation of dioxyn and carbon monoxide (CO) is suppressed.

(5) Since in the fluidized bed gasification furnace, gasification is effected under a reducing atmosphere, the air supply amount may be small. Further, since the amount of heat generated in the fluidized bed gasification furnace is small, it is possible to adjust the temperature of the first fluidized bed without pouring water into the fluidized bed, so that energy loss is minimized.

(6) In the case where lime stone is charged into the second fluidized bed, the amount of wear of the heat transfer tubes is considerably reduced as compared with the case of sand.

(7) In the case where lime stone is charged into the second fluidized bed and decarbonated and calcined quick lime is supplied into the first fluidized bed, fresh and high-activity quick lime is supplied to the first fluidized bed. Thus the desalting reaction can be carried out efficiently.

Figure 2:
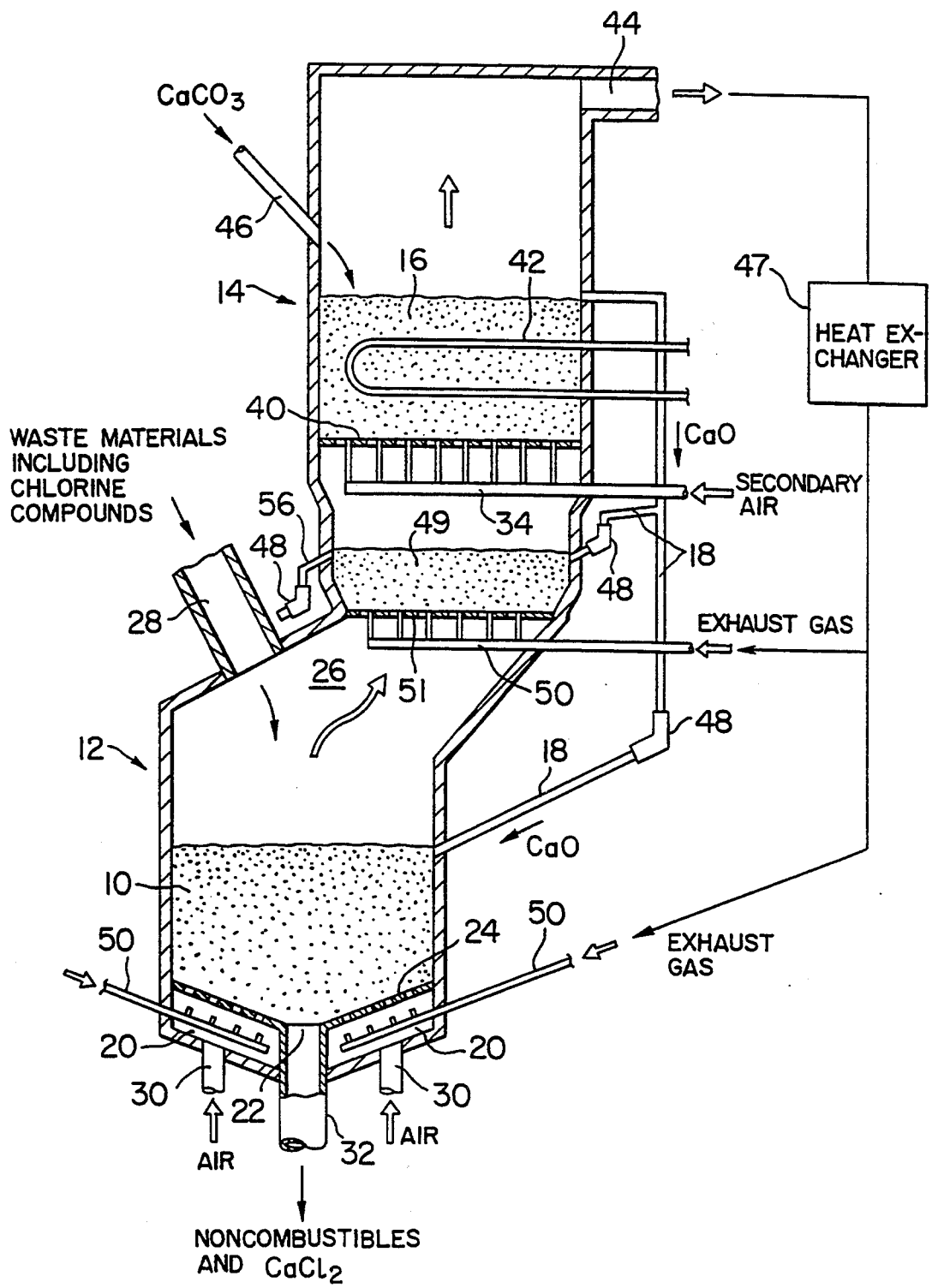
FIG. 2 is a vertical sectional view of an incinerator having three fluidized beds according to the present invention.

FIG. 2 shows a further embodiment of the present invention. Parts in this embodiment equivalent to those of the embodiment shown in FIG. 1 are indicated by the same reference numerals, and its description will be omitted. Only different features will be described below.

The embodiment shown in FIG. 2 is different from the embodiment shown in FIG. 1 in that in the FIG. 2 embodiment, a third or middle-stage fluidized bed 49 is provided between a fluidized bed gasification furnace 12 and a fluidized bed combustion furnace 14.

The middle-stage fluidized bed 49 is connected to the top of the fluidized bed gasification furnace 12 to remove unreacted hydrogen chloride. Fluidizing medium for the middle-stage fluidized bed 49 is an alkaline metal oxide (for example, CaO).

The middle-stage fluidized bed 49 is supported by an air distributor plate 51, and a pipe 50 for circulating and supplying cooled exhaust gas is provided under the air distributor plate 51. The pipe 50 for circulating and supplying cooled exhaust gas is provided to cool combustion exhaust gas discharged from the exhaust gas outlet 44 by means of a heat exchanger 47 and to supply the cooled gas into the fluidized bed 49. A discharge pipe 56 for discharging calcium chloride ($CaCl_2$) is provided on the side wall of the middle-stage fluidized bed 49.

The fluidized bed combustion furnace 14 is connected to the upper portion of the third or middle-stage fluidized bed 49 to burn gas generated in the fluidized bed gasification furnace 12 and to recover heat.

Further pipes 50 for circulating and supplying cooled exhaust gases are provided under the air distributor plate 24 of the gasification furnace 12. The pipes 50 for circulating and supplying cooled exhaust gas are provided under either one or both of the middle-stage fluidized bed 49 and the lower-stage fluidized bed 10.

The upper-stage fluidized bed 16 of the combustion furnace 14 is connected with both the middle-stage fluidized bed 49 and the lower-stage fluidized bed 10 through a pipe 18 for supplying alkaline metal oxide provided with a valve 48.

The operation of the embodiment shown in FIG. 2 is similar to that of the embodiment shown in FIG. 1. The fluidized bed 10 is fluidized by air blown through the air distributor plate 24 of the fluidized bed gasification furnace 12. The bed 10 is partly or wholly made of quick lime. The chlorine compounds containing waste materials are charged from the waste material inlet 28 into the lower-stage fluidized bed 10. The temperature of the fluidized bed 10 is set to 500° to 650° C., and the waste materials charged into the furnace are partly burned under a reducing atmosphere while the remainder of the waste materials is gasified. Since a part or the whole of the fluidizing medium in the lower-stage fluidized bed 10 comprises quick lime, hydrogen chloride generated from vinyl chloride or other chlorine containing plastics contained in the waste materials is formed into calcium chloride ($CaCl_2$), and the chlorine is changed into solid. In this case, combustion exhaust gas cooled by a heat exchanger 47 are circulated and supplied from the bottom of the lower-stage fluidized bed 10 through the pipes 50 for circulating and supplying cooled exhaust gas in order to lower the temperature within the lower-stage fluidized bed 10 to promote the absorption of HCl into CaO.

In the case where the bulk specific gravity of the waste materials is so small that the waste materials are not drawn into the lower-stage fluidized bed 10 but they are burned on the surface of the bed, HCl is not sufficiently absorbed into CaO. Under such a condition, unreacted hydrogen chloride (HCl) is introduced into the middle-stage fluidized bed 49, where HCl is absorbed into CaO.

In this case, combustion exhaust gas cooled by the heat exchanger 47 is circulated and supplied from the bottom of the middle-stage fluidized bed 49 through the pipe 50 for circulating and supplying cooled exhaust gas in order to lower the temperature within the middle-stage fluidized bed 49 to promote the absorption of HCl into CaO.

Combusted gas generated in the fluidized bed gasification furnace 12 and completely desalted in the middle-stage fluidized bed 49 is introduced through the air distributor plate 40 into the upper-stage fluidized bed 16 of the fluidized bed combustion furnace 14, where the combusted gas is mixed, within the upper-stage fluidized bed 16, with secondary air blown into the upper-stage fluidized bed 16 from the secondary air supply pipe 34.

The temperature of the upper-stage fluidized bed 16 is set to 800° to 900° C. Complete combustion of the gas mixed with the secondary air is carried out in the bed 16, and heat exchange is carried out between the quick lime (CaO) which forms a fluidizing medium and the heat transfer tube 42. A predetermined amount of lime stone ($CaCO_2$) is supplied to the upper-stage fluidized bed 16 and calcined, and a reaction of $CaCO_3 \rightarrow CaO + CO_2$ occurs. When the decarbonation proceeds at a temperature of from 800° to 900° C., quick lime having high activity is produced. The quick lime is charged into the middle-stage fluidized bed 49 and the lower-stage fluidized bed 10 through the pipe 18 for supplying alkaline metal oxide, and a quick desalting reaction is carried out.

On the other hand, a part of calcium chloride ($CaCl_2$) pulverized in the lower-stage fluidized bed 10 and the middle-stage fluidized bed 49 passes through the upper-stage fluidized bed 16 while being carried by the gas. At this time, the $CaCl_2$ is reacted with water in the gas to regenerate hydrogen chloride, but it is reacted by CaO scattered within a bag filter (not shown) installed downstream, with resultant desalting reaction.

In addition to the advantageous effects of the embodiment shown in FIG. 1, the embodiment shown in FIG. 2 exhibits the following effects.

(1) Three fluidized beds are arranged in series. A gasification furnace is provided in which a part or the whole of fluidizing medium of the lower-stage fluidized bed comprises quick lime. The middle-stage fluidized bed is designed for absorption of hydrogen chloride and the upper-stage fluidized bed is designed for combustion. With this arrangement, hydrogen chloride can be effectively removed within the lower-stage fluidized bed and the middle-stage fluidized bed.

(2) Lime stone is charged into the upper-stage fluidized bed and quick lime subjected to decarbonation and calcination is supplied to the middle-stage fluidized bed and the lower-stage fluidized bed whereby fresh and high-activity quick lime is supplied to the middle-stage fluidized bed. The desalting reaction can be carried out more effectively.

(3) Cooled exhaust gas is circulated and supplied to the lower-stage fluidized bed and/or the middle-stage fluidized bed whereby the temperature of the middle-stage fluidized bed is readily lowered and the hydrogen chloride can be effectively absorbed and removed.

Figure 3:
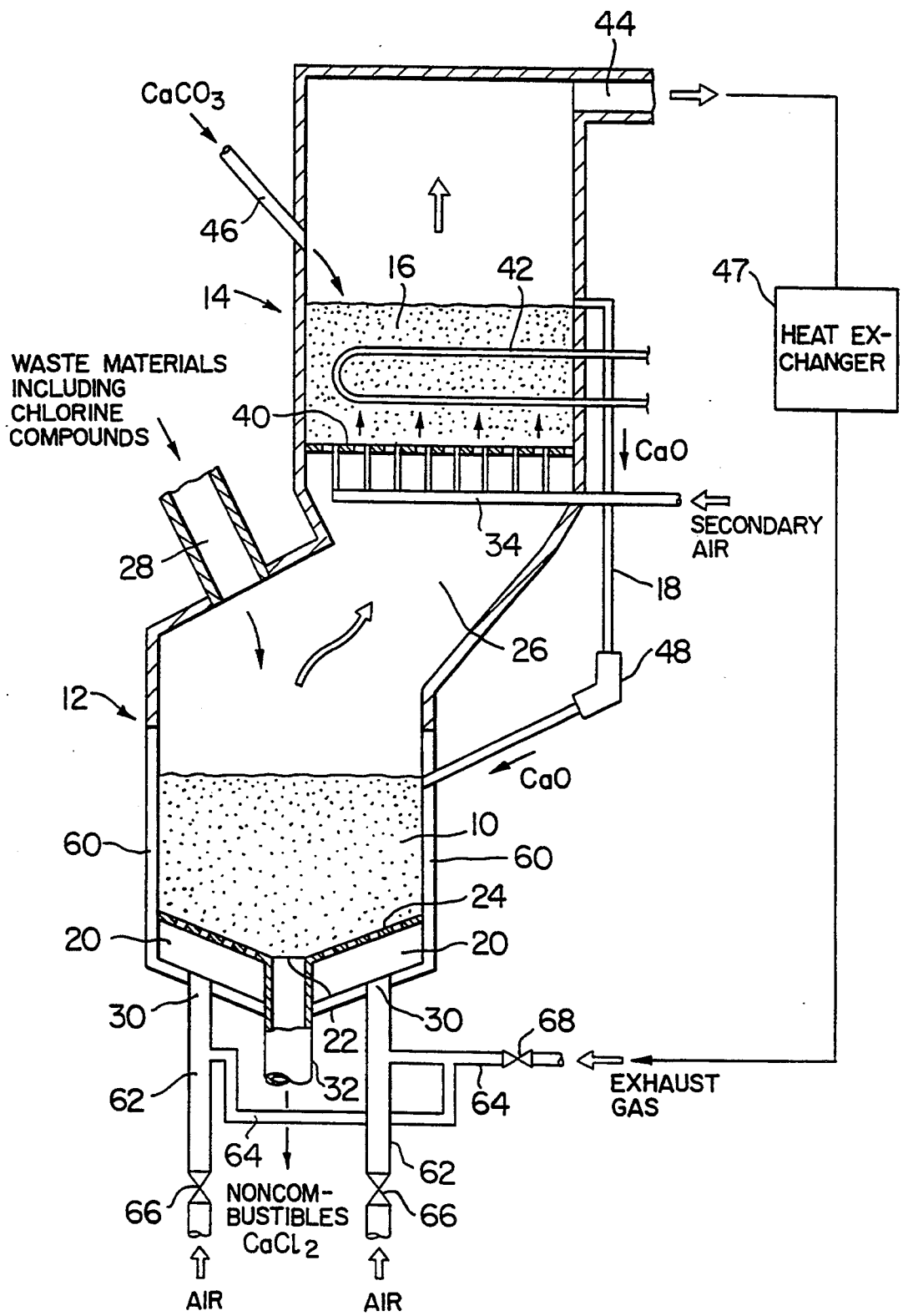
FIG. 3 is a vertical sectional view of a further embodiment according to the present invention.

FIG. 3 shows another embodiment of the present invention. Parts in this embodiment equivalent to those of the embodiments shown in FIG. 1 and FIG. 2 are indicated by the same reference numerals, and description thereof will be omitted. Only different features will be described below.

In this embodiment, air supply pipes 62 each having a regulating valve 66 are provided in order that the amount of air supplied into the air pressure accumulation chamber 20 of the lower-stage fluidized bed 10 is regulated to lower the amount of generated heat. The temperature of the bed 10 can be lowered by regulating the amount of air supplied into the bed 10. Further, the wall of the fluidized bed gasification furnace 12 is covered in the region for receiving the fluidized bed 10 with a group of evaporation tubes (membrane wall) 60, whereby a part of heat generated within the lower-stage fluidized bed 10 can be recovered and the temperature of the fluidized bed 10 can be reduced. Since a part or the whole of fluidizing medium comprises an alkaline metal oxide, the surface of the heat transfer tubes are protected from corrosion.

A pipe 64 for circulating and supplying cooled exhaust gas is connected to the air supply conduits 62. The pipe 64 for circulating and supplying cooled exhaust gas is provided to circulate and supply combustion exhaust gas cooled by a heat exchanger 47 to the bottom of the lower-stage fluidized bed 10 via the air supply conduits 62. The pipe 64 for circulating and supplying cooled exhaust gas is provided with air-flowrate control means 68 such as a valve and a damper. It is to be noted that the pipe 64 for circulating and supplying cooled exhaust gas may be connected directly to the air pressure accumulation chamber 20.

In the embodiment shown in FIG. 3, the following operation is obtained in addition to the operation described in connection with FIG. 1.

The ratio of the amount of air supplied to the lower-stage fluidized bed 10 to the amount of supply of the waste materials is made small. Therefore, the waste materials are not entirely burned but gasified to thereby lower the heat generation amount so that the temperature of the lower-stage fluidized bed 10 can be maintained at a low level. Further, the outer region of the lower-stage fluidized bed 10 is covered with a group of evaporation tubes (membrane wall) 60 to recover a part of heat generated in the lower-stage fluidized bed 10 to thereby further lower the temperature of the fluidized bed 10.

Further, the cooled combustion exhaust gas is circulated and supplied to the lower-stage fluidized bed 10 through the pipe 64 for circulating and supplying cooled exhaust gas whereby the temperature of the lower-stage fluidized bed 10 can be maintained at a low level. In the case where the temperature of the lower-stage fluidized bed 10 need to be further lowered, water is poured into the fluidized bed 10.

Figure 4:
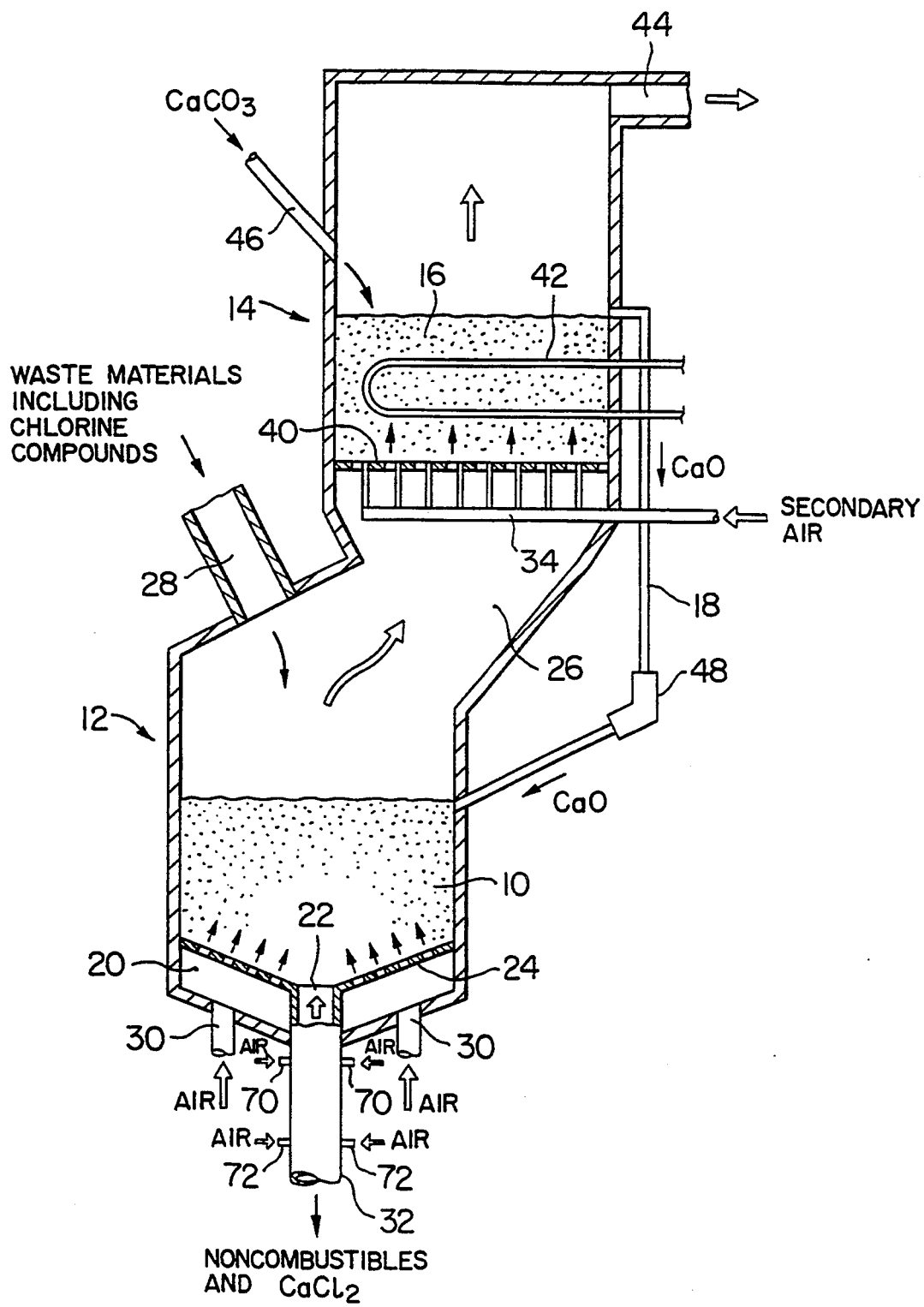
FIG. 4 is a vertical sectional view of another embodiment according to the present invention.

FIG. 4 shows still another embodiment of the present invention. This embodiment is different from the embodiment shown in FIG. 1 in the following respects.

Air supply pipes 70 and 72 are connected to the pipe for discharging non-combustible materials and $CaCl_2$. While in FIG. 4, the air supply pipes 70 are provided in a two-stage manner, it is to be noted that they can be installed in a single stage manner or in a three-stage manner or more. In the case of two stages, a part of non-burnt portion in the material to be discharged is burned by pressurized air supplied from the upper-stage air supply pipe 70, and the non-burnt portion is further completely burned by pressurized air from the lower-stage air supply pipe 72.

More specifically, air required to completely burn the non-burnt portion in the material to be discharged is supplied into the pipe 32 for discharging non-combustible materials and $CaCl_2$ to completely burn the non-burnt portion and after this, they are discharged outside the system. By doing this, ash to be discharged becomes white in color, which is desirable in terms of environmental protection.

Figure 5:
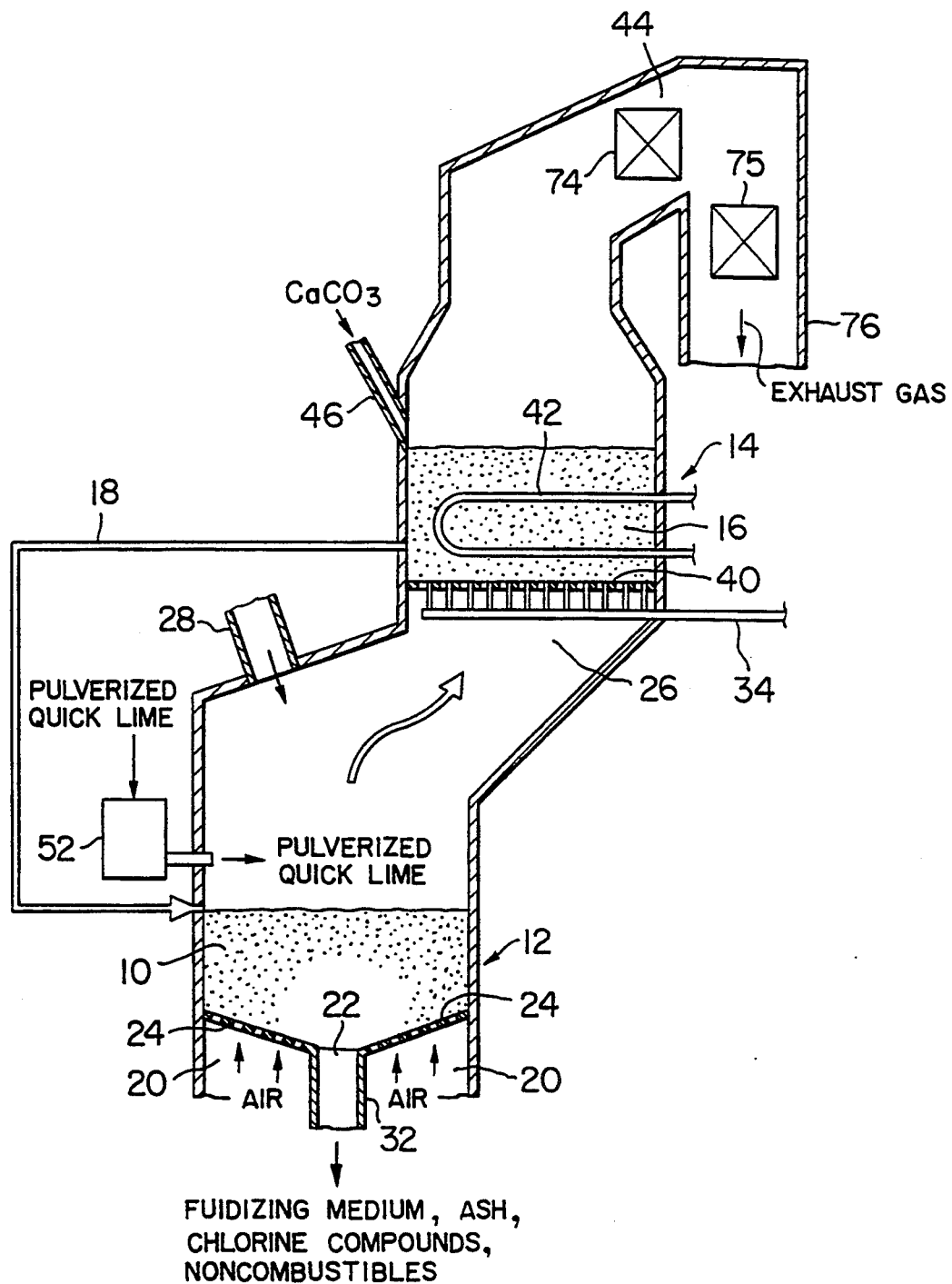
FIG. 5 is a vertical sectional view of an embodiment according to the present invention having a device for supplying pulverized quick lime.

An embodiment of the present invention shown in FIG. 5 is different from the embodiment shown in FIG. 1 in the following. A cooling evaporator 74 is provided in the exhaust gas outlet 44 of the upper-stage fluidized bed combustion furnace 14, and a superheater 75 is provided in an exhaust gas flue 76. These evaporator 74 and superheater 75 are composed of heat transfer tubes. Above the upper level of the lower-stage fluidized bed 10, there is provided a device 52 for supplying pulverized alkaline metal oxide, such as an ejector and a blower. For example, pulverized quick lime (CaO) is injected from the supply device 52.

In this manner, the pulverized quick lime is injected toward the lower-stage fluidized bed 10 whereby the quick lime is reacted with hydrogen chloride contained in the exhaust gas to form calcium chloride. In the embodiments shown in FIGS. 1 to 4, hydrogen chloride is left that cannot be removed in the lower-stage fluidized bed 10. This hydrogen chloride is, however, effectively removed by the pulverized alkaline metal oxide injected from the supply device 52. More specifically, because the hydrogen chloride generated from the chlorine compounds containing waste materials which have been burned near the upper level of the lower-stage fluidized bed 10 is present above the fluidized bed 10, it is difficult to remove but can be completely removed by the device 52. Further, because less hydrogen chloride is present in the gas which has been subjected in the upper-stage fluidized bed 16 and has assumed a temperature of 800° to 900° C. as a result of complete combustion, the heat transfer tubes 74 and 75 are hard to be corroded, and the recovery of heat can be satisfactorily carried out.

Figure 6:
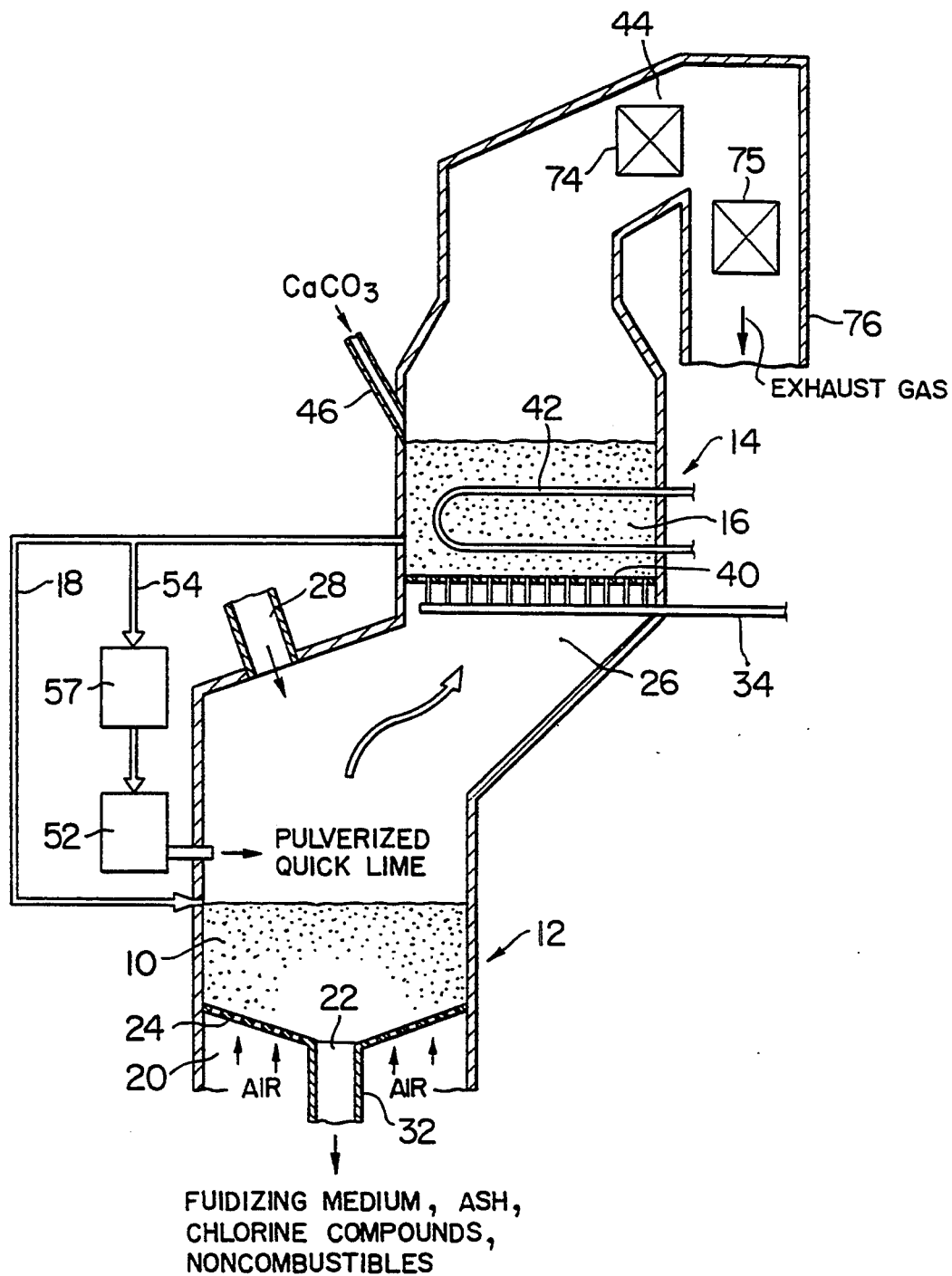
FIG. 6 is a vertical sectional view of a modified embodiment of FIG. 5.

In an embodiment shown in FIG. 6, an extraction pipe 54 for alkaline metal oxide is connected in the middle of the pipe 18 for supplying alkaline metal oxide, connecting the upper-stage fluidized bed 16 with the lower-stage fluidized bed 10, the extracted pipe 54 being connected to the upper side of the lower-stage fluidized bed 10 through a crusher 57 and a device 52 for supplying alkaline metal oxide. Quick lime produced by decomposition of lime stone in the upper-stage fluidized bed 16 is crushed and supplied to the lower-stage fluidized bed 10. It is to be noted that the extraction pipe 54 for alkaline metal oxide may be connected directly to the upper-stage fluidized bed 16. Other structure and operation are similar to those of the embodiment shown in FIG. 5.

Figure 7:
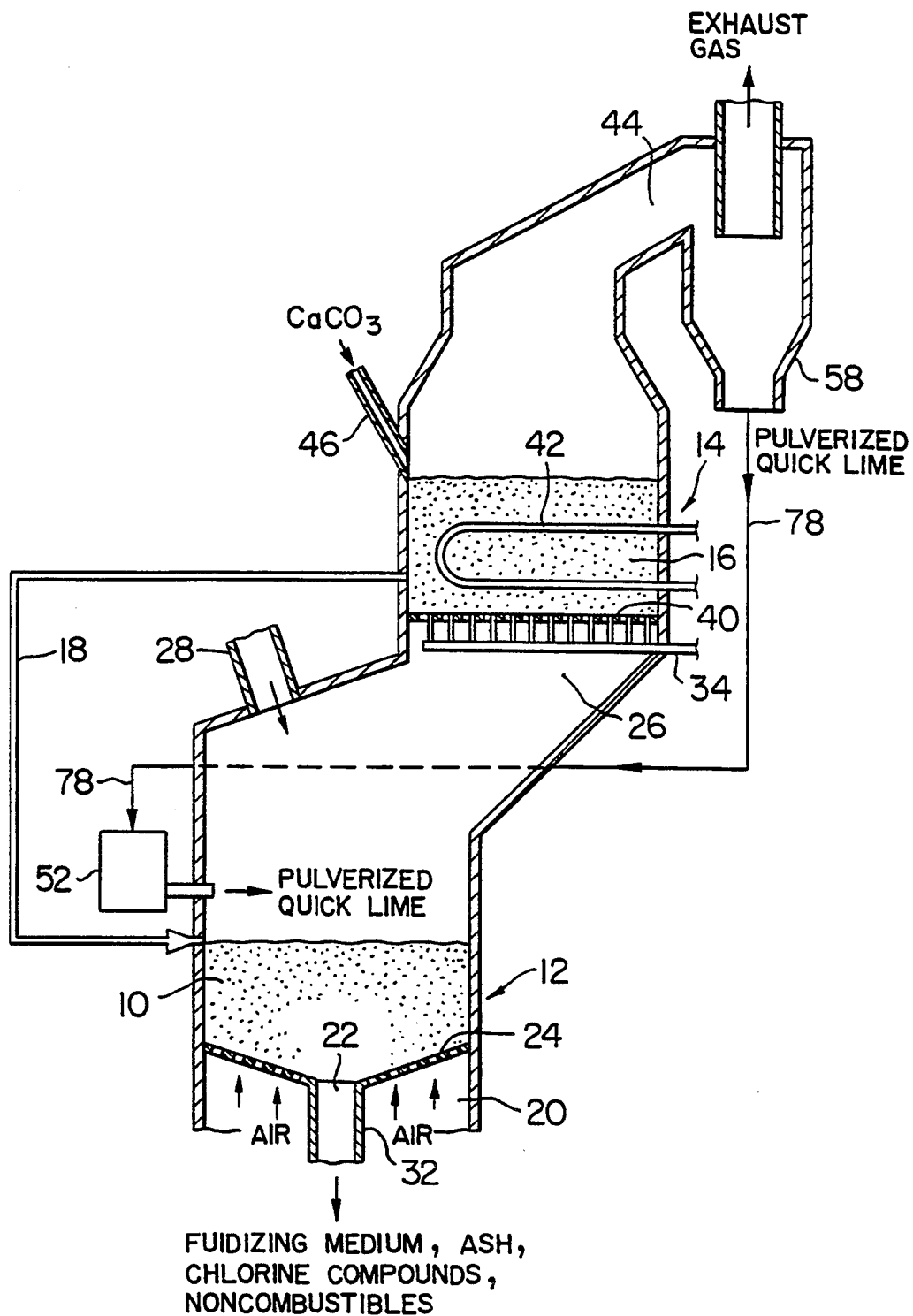
FIG. 7 is a vertical sectional view of still another modified embodiment of FIG. 5.

In an embodiment shown in FIG. 7, a fine particle collector 58 such as a cyclone is connected to an exhaust gas duct 44 of the upper-stage combustion furnace 14, and an extraction pipe 78 for pulverized alkaline metal oxide for extracting pulverized quick lime from the bottom of the fine particle collector 58 is connected to the upper side of the lower-stage fluidized bed 10 through a device 52 for supplying pulverized alkaline metal oxide, whereby powdered and scattered quick lime out of the quick lime produced in the upper-stage fluidized bed 16 are recovered by the collector 58 and supplied to the lower-stage gasification furnace 12. Other structure and operation are similar to those of the embodiment shown in FIG. 5.

Figure 8:
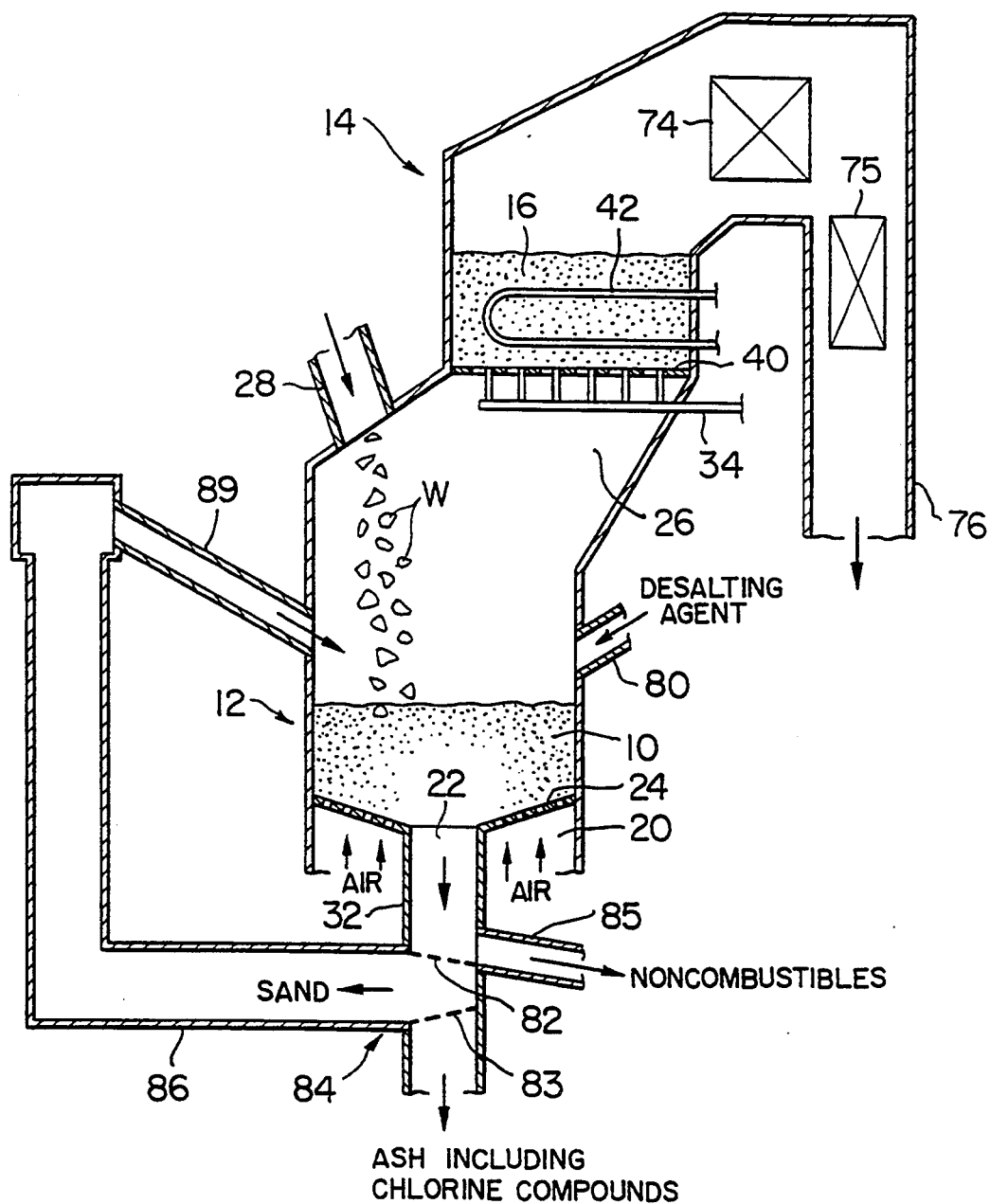
FIG. 8 is a vertical sectional view of an embodiment according to the present invention provided with a chloride removing means.
Figure 9:
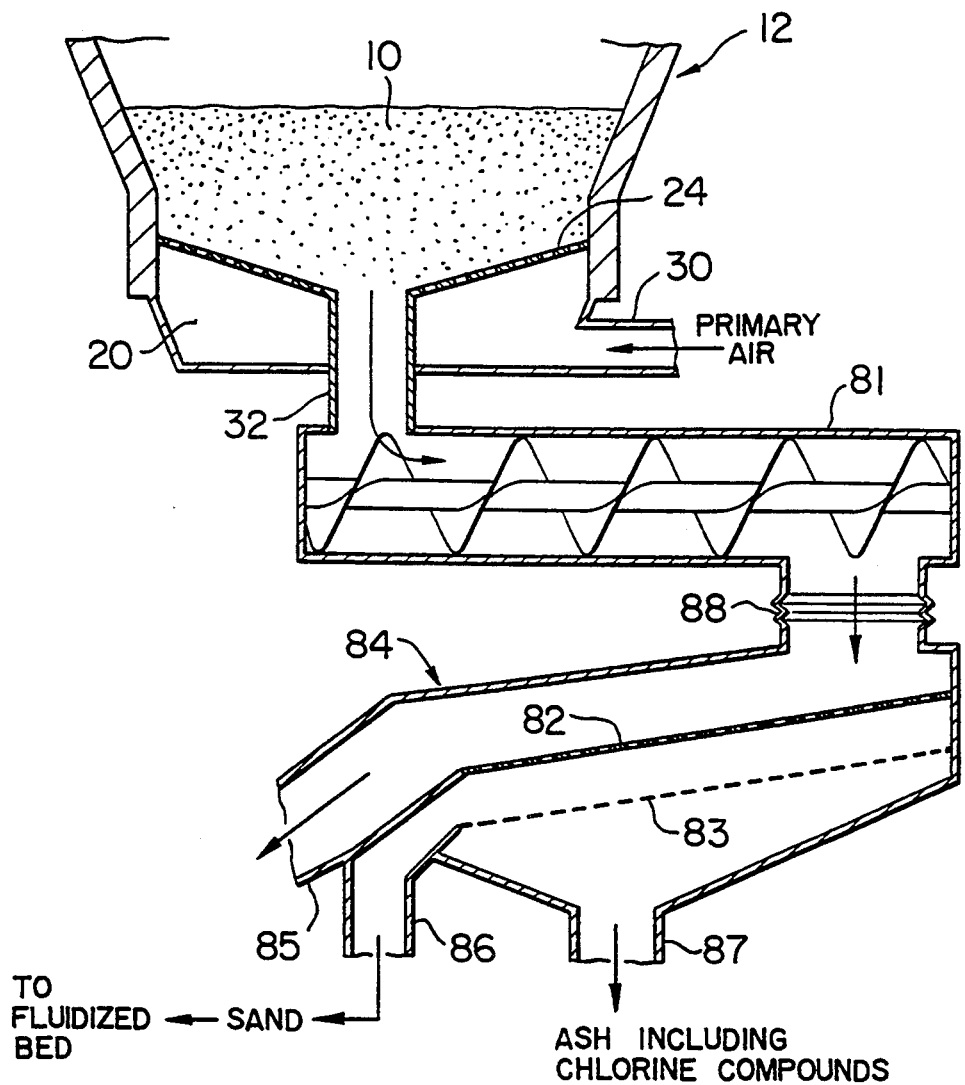
FIG. 9 is a detailed view of a lower portion of the embodiment shown in FIG. 8.

FIGS. 8 and 9 show another embodiment of the present invention. In this embodiment, there is provided a supply port 80 for supplying a desalting agent to the fluidized bed 10 of the gasification furnace 12. Further, waste materials being charged through the waste material inlet 28 are indicated at reference character W. The desalting agent includes an alkaline metal (Ca or Mg) desalting agent, for example, quick lime (CaO).

A classification device 84 such as a two-stage vibration sieve having a coarse sieve 82 at the upper stage and a fine sieve 83 at the lower stage, is connected through a discharge conveyor 81 to the discharge pipe 32 of the fluidized bed gasification furnace 12, as shown in FIG. 9. An extraction pipe 85 for non-combustible material is connected to an upper space of the coarse sieve 82 at the upper stage, and a pipe 86 for circulating fluid medium is connected to an upper space of the fine sieve 83 at the lower stage. The two-stage classification device 84 is provided at the bottom with a discharge port 87 for extracting ash including chlorides. The discharge conveyor 81 is connected with the classification device 84 through an expansion joint 88.

The operation of this embodiment will be described below. The ash, non-combustible materials, chlorides and fluidizing medium (for example, sand) extracted from the fluidized bed 10 via the discharge pipe 32 and the discharge conveyor 81 are introduced into the two-stage classification device 84. The non-combustible materials are left on the coarse sieve 82 at the upper stage, and the fluidizing medium is left on the fine sieve 82 at the lower stage.

Because the chlorides are softer than the fluidizing medium, the chlorides are powdered due to the friction with the fluidizing medium such as sand or due to the reaction itself during the fluidizing. Therefore, the chlorides drop on the lower side of the fine sieve 83 at the lower stage, and the ash including chlorides are extracted from the discharge port 87 at the bottom.

The non-combustible materials are extracted outside the system via the extraction pipe 85 for non-combustible materials, and the fluidizing medium such as sand is circulated to the fluidized bed 10 via the pipes 86 and 89 for circulating fluidizing medium.

Figure 10:
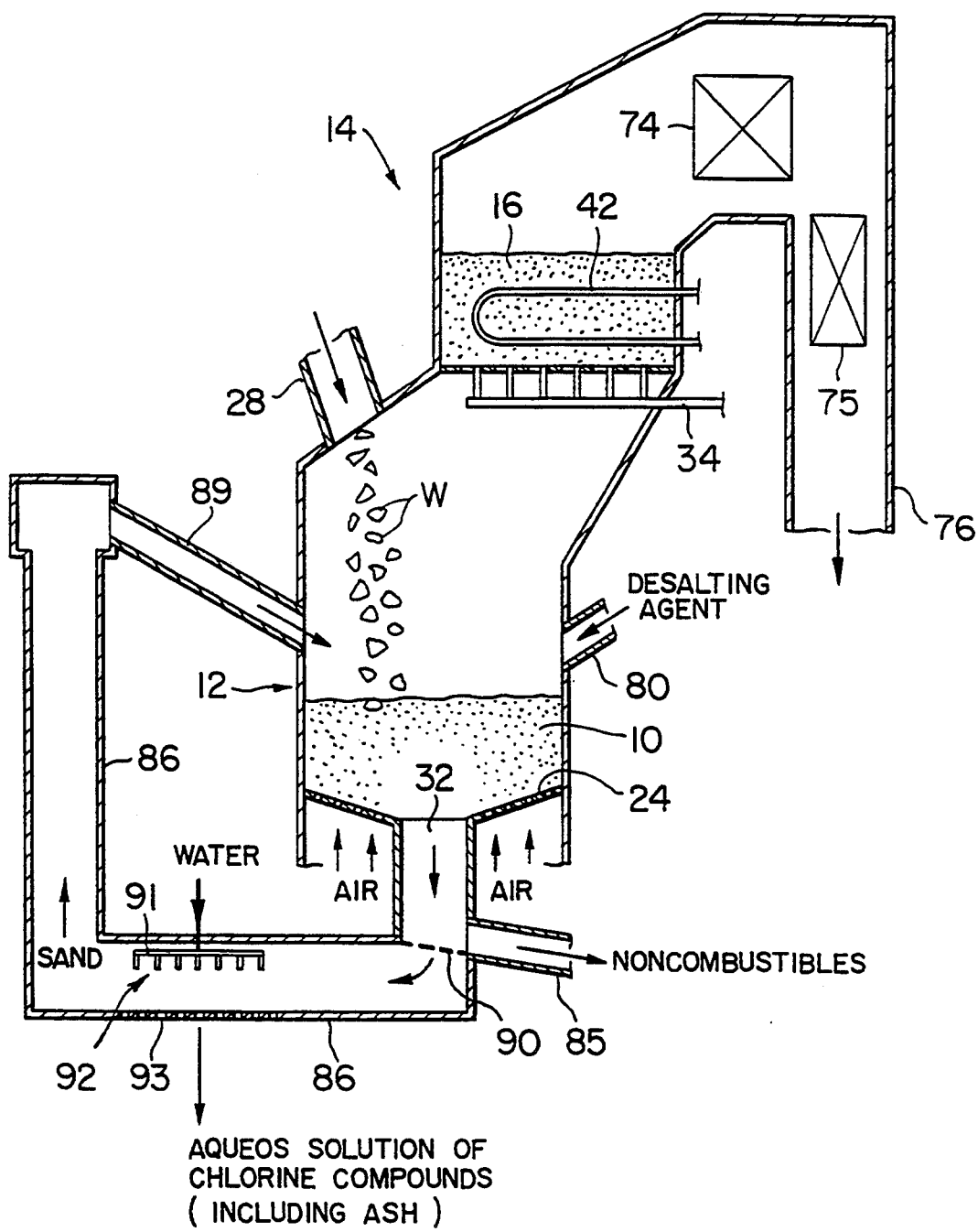
FIG. 10 is a vertical sectional view showing a modified embodiment of FIG. 8.

In an embodiment shown in FIG. 10, a classification device 90 such as a vibration sieve is connected to the discharge pipe 32, and an extraction pipe 85 for non-combustible materials is connected to an upper space of the classification device 90. Furthermore, a pipe 86 for circulating fluidizing medium is connected to the lower side of the classification device 90, water supply means 91 is provided in the middle of the pipe 86 to form a washing device 92, and a liquid extraction means 93 formed from slits or the like is provided under the washing device 92. It is to be noted that a discharge conveyor is provided on the upstream side of the classification device 90 similarly to the case of FIG. 9, but it is not shown in the figure.

Ash, non-combustible materials, chlorides and fluidizing medium (for example, sand) extracted from the fluidized bed 10 via the discharge pipe 32 are introduced into the classification device 90 such as a vibration sieve, and are separated into non-combustible materials on the sieve and fluidizing medium, ash and chlorides under the sieve. The fluidizing medium, ash, and chlorides are washed with water in the washing device 92 in the pipe 86 for circulating fluid medium, and chlorides having high solubility to water are dissolved into water and extracted outside the system as a chloride aqueous solution from the liquid extraction means 93. Ash is also contained in the chloride aqueous solution. The fluidizing medium from which chlorides and ash are separated is circulated to the fluidized bed 10 via the pipes 86 and 88 for circulating fluidizing medium 86. Other structures are similar to those of the embodiment shown in FIG. 8.

Figure 11:
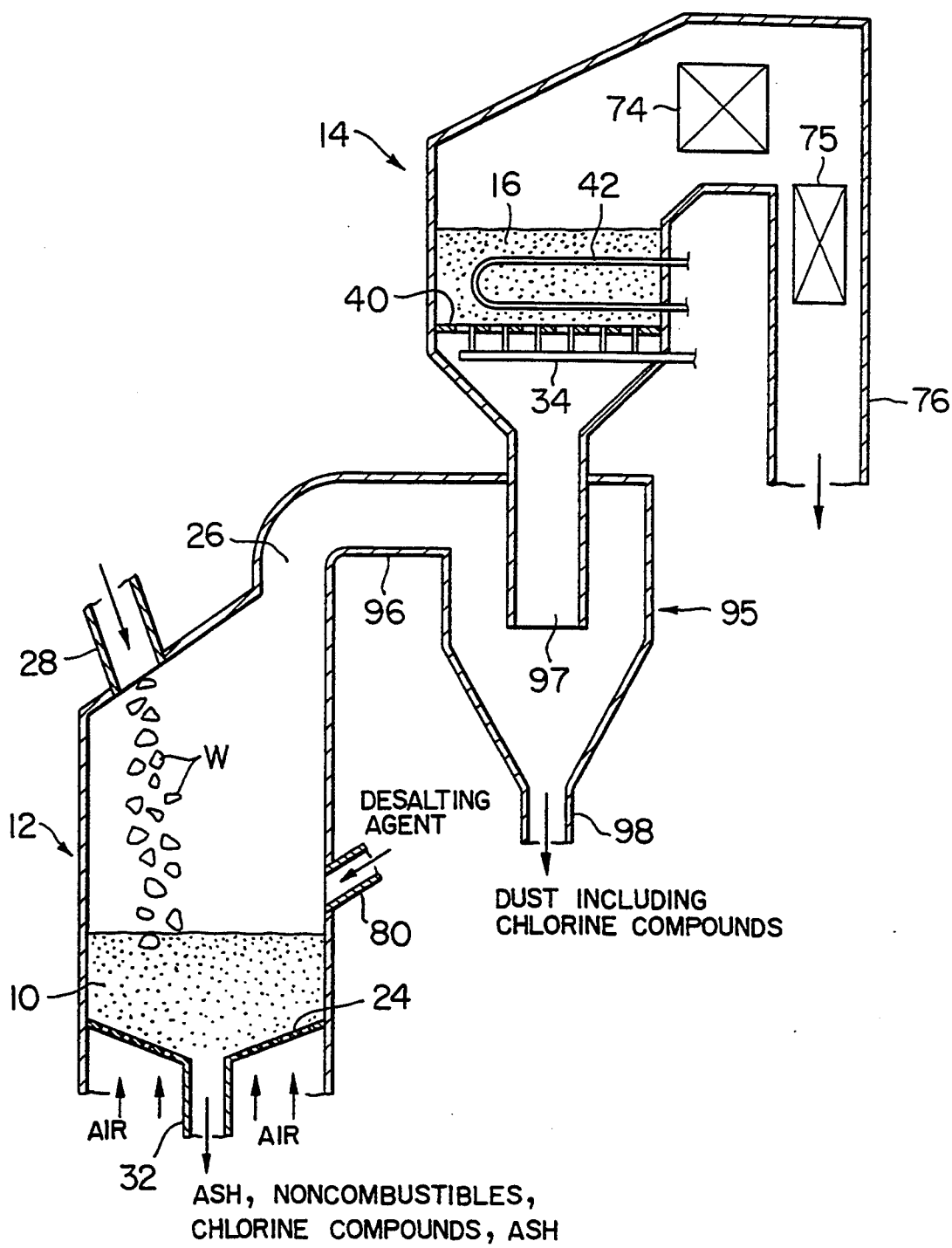
FIG. 11 is a vertical sectional view of another embodiment according to the present invention.

In an embodiment shown in FIG. 11, a cyclone 95 as a dust collector is provided on the downstream side of the fluidized bed 10. That is, an exhaust gas pipe 96 is connected to the exhaust gas outlet 26 at the upper side of the fluidized bed 10, and the cyclone 95 is connected to the exhaust gas pipe 96. A combustion furnace 14 including an upper-stage fluidized bed 16 is connected to an exhaust gas outlet pipe 97 of the cyclone 95.

Powdered chloride out of chlorides produced as a result of reaction between HCl and CaO produced by the combustion of waste materials, enter the cyclone 95 while being carried by the exhaust gas together with other fine dusts. The dust including chlorides is separated from exhaust gas in the cyclone 95. The dust is discharged outside the system from the lower discharge port 98 while the exhaust gas is completely burned by secondary air within the fluidized bed 16. As a result, the chloride never enters the fluidized bed 16, and regeneration of HCl due to the decomposition of the chloride is suppressed. Other structures are similar to the case of the embodiments shown in FIG. 8 and FIG. 9.

Figure 12:
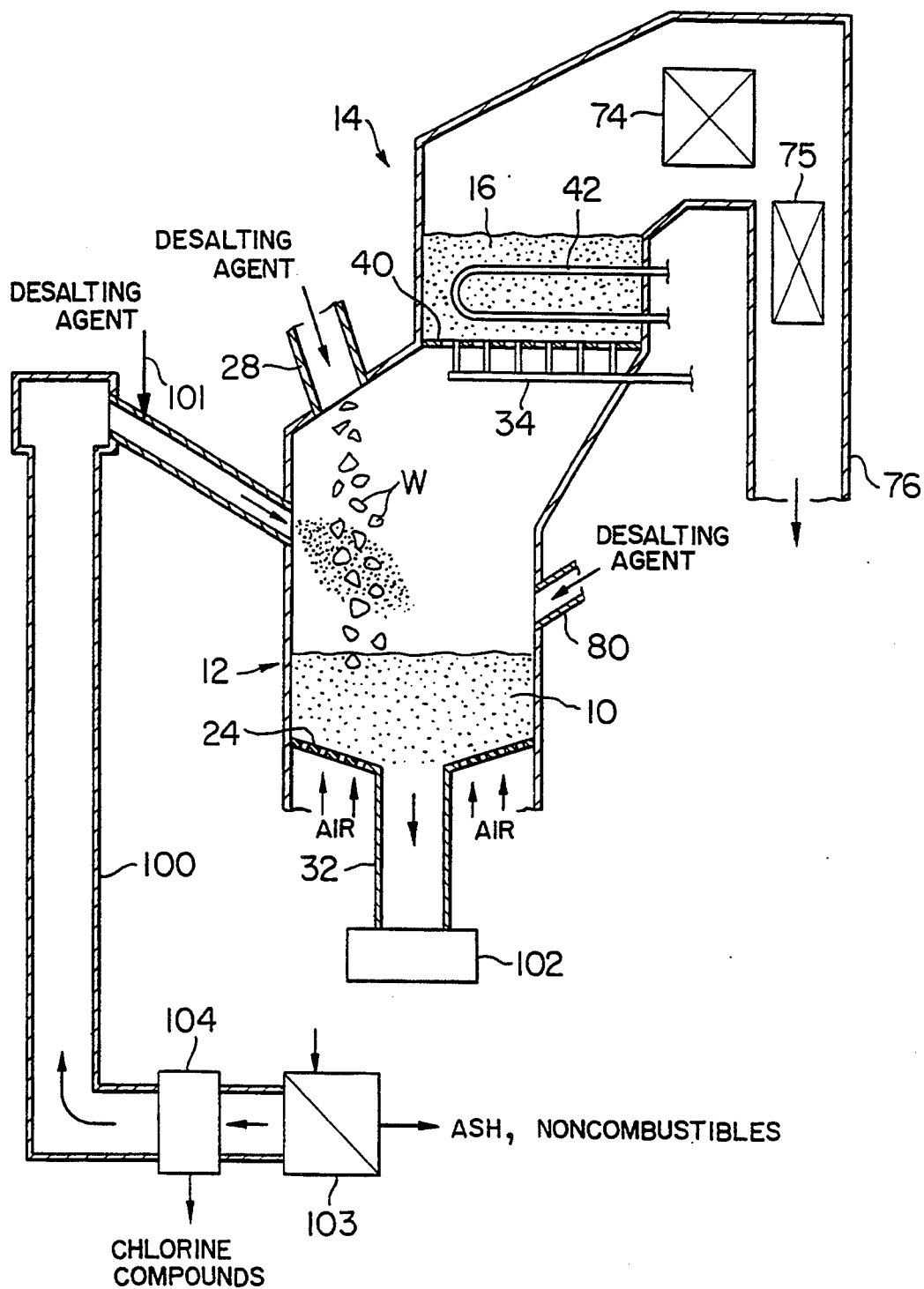
FIG. 12 is a vertical sectional view of still another embodiment according to the present invention.

In an embodiment shown in FIG. 12, a desalting agent is mixed with waste materials and supplied into the furnace through the inlet 28 for waste materials. The desalting agent may be supplied through the supply port 80 for desalting agent.

Figure 13:
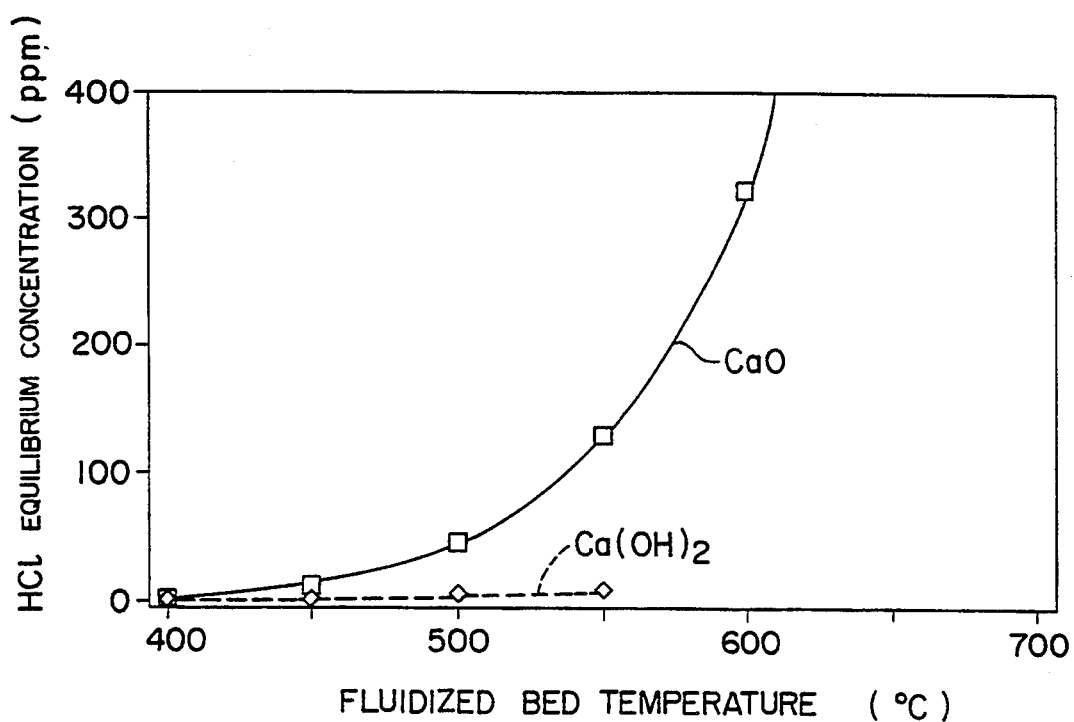
FIG. 13 is a graphic representation of a result of operation of the incinerator shown in FIG. 12.

When the temperature of the fluidized bed is controlled to a relatively low temperature range (from approximately 500° to approximately 650° C.) and CaO is used as a desalting agent, it is possible to suppress the HCl concentration to a value from approximately 100 to approximately 400 ppm, as shown In FIG. 13. This concentration is further reduced due to dilution by the secondary air to about ⅓ to ¼, whereby the final hydrogen chloride concentration can be suppressed to a value lower than 150 ppm or even lower than 100 ppm. For this reason, a high temperature steam or fluid of the order of 500° C. or more can be produced by heat recovery without being accompanied by the big problem of corrosion of the heat recovery pipes.

In this embodiment, in the case where the fluidizing medium (for example, sand) is circulated, as shown in FIG. 12, a desalting agent is charged into a fluidizing medium circulating pipe 100, as indicated by arrow 101, so that the desalting agent is mixed with waste materials W to be charged into the fluidized bed 10. Also in this case, the desalting agent may be supplied from a desalting agent supply port 80 and/or an inlet 28 for waste materials.

The desalting agent charged into the furnace is reacted with HCl produced by the combustion of waste materials and changed into a metal chloride. The fluidizing medium, ash, chloride and non-combustible materials are extracted by a discharge device 102 via a discharge pipe 32 and are separated by a classification device 103, such as a sieve, into non-combustible materials, and fluidizing medium, chloride and ash, after which the fluidizing medium, chloride and ash are introduced into a classification device, and a chloride removing device 104 such as a water washing device to remove the chloride and ash. Thereafter, the fluidizing medium is circulated within the furnace via the pipe 100 for reuse. Since the chloride is softer than the fluidizing medium, it is powdered due to the friction with the fluidizing medium and so on during the fluidization and due to the reaction itself. Therefore, the chloride can be easily separated by the classification device. Further, since the chloride has a solubility to water, it can be easily removed as an aqueous solution by a washing device using water.

As described hereinabove, hydrogen chloride can be eliminated within the incinerator according to the present invention. Furthermore, other harmful gases such as CO, dioxin, $NO_x$ and $SO_x$ can also be reduced remarkably. That is, because the furnace having the first fluidized bed is a gasification furnace, it can considerably reduce $NO_x$, and because the second fluidized bed has a fluidizing medium containing quick lime (CaO), $SO_x$ is caused to react with CaO to form plaster ($CaSO_4$) whereby the quantity of $SO_x$ is redued. Furthermore, because the second fluidized bed functions to promote intermixing of gas so that a combustion reaction proceeds sufficiently and therefore the quantity of CO and dioxin is considerably reduced. The above fact enables incinerators, which are being subjected to restrictions to their geographical location of installation because of their generation of harmful gases, to be installed under relaxed condition of restriction.

What is claimed is:

1. An incinerator for waste materials including chlorine compounds, comprising:
  a fluidized-bed gasification furnace including a first fluidized bed made of at least a fluidizing medium of an alkaline metal oxide, means for supplying air into said first fluidized bed, means for supplying waste materials including chlorine compounds, and means for discharging unburned materials in the waste materials out of said first fluidized bed, whereby the waste materials are gasified in the first fluidized bed and generated hydrogen chloride is changed into a salt; and
  a fluidized-bed combustion furnace connected to the downstream side of said gasification furnace so as to receive gases produced in the gasification furnace and having a second fluidized bed for burning said gases;
  wherein said salt is not conveyed from said fluidized-bed gasification furnace to said fluidized-bed combustion furnace other than by gas pressure.

2. An incinerator for waste materials according to claim 1, wherein the fluidizing medium of an alkaline metal oxide constituting the first fluidized bed is quick lime.

3. An incinerator for waste materials according to claim 1, wherein the first fluidized bed is supported on an air distributor plate, and the means for discharging unburned materials from the first fluidized bed is opened to a part of said air distributor plate.

4. An incinerator for waste materials according to claim 1, wherein the fluidized-bed combustion furnace has means for supplying an alkaline metal carbonate to the second fluidized bed.

5. An incinerator for waste materials according to claim 4, wherein the second fluidized bed is formed from a fluidizing medium of an alkaline metal oxide.

6. An incinerator for waste materials according to claim 1, further comprising means for supplying the alkaline metal oxide into the first fluidized bed.

7. An incinerator for waste materials according to claim 1, further comprising heat recovery means provided within the second fluidized bed.

8. An incinerator for waste materials according to claim 1, wherein the second fluidized bed has means for blowing secondary air therein.

9. An incinerator for waste materials according to claim 1, wherein the fluidized-bed combustion furnace is located above the fluidized-bed gasification furnace.

10. An incinerator for waste materials according to claim 1, further comprising a third fluidized bed disposed between the fluidized-bed gasification furnace and the fluidized-bed combustion furnace.

11. An incinerator for waste materials according to claim 10, further comprising means for supplying the alkaline metal oxide from the second fluidized bed to the first fluidized bed and the third fluidized bed.

12. An incinerator for waste materials according to claim 10, wherein the fluidized-bed combustion furnace is provided with an exhaust gas outlet, said exhaust gas outlet being connected to the first and third fluidized beds through exhaust-gas cooling means and an exhaust gas circulating and supplying pipe.

13. An incinerator for waste materials according to claim 1, further comprising means for cooling the first fluidized bed.

14. An incinerator for waste materials according to claim 1, wherein said means for supplying air to the first fluidized bed has air flowrate regulating means.

15. An incinerator for waste materials according to claim 1, wherein the fluidized-bed combustion furnace has an exhaust gas outlet, said exhaust gas outlet being connected to said means for supplying air through exhaust gas cooling means.

16. An incinerator for waste materials according to claim 1, wherein said means for discharging the unburned material from the first fluidized bed is provided with air supply means.

17. An incinerator for waste materials according to claim 1, further comprising means for supplying a pulverized alkaline metal oxide above the first fluidized bed into the fluidized-bed gasification furnace.

18. An incinerator for waste materials according to claim 1, further comprising means for removing the alkaline metal oxide of the second fluidized bed, means for crushing the removed metal oxide, and means for supplying the crushed metal oxide into the fluidized-bed gasification furnace.

19. An incinerator for waste materials according to claim 1, wherein fine particle collecting means is provided at the exhaust gas outlet of the fluidized-bed combustion furnace.

20. An incinerator for waste materials according to claim 19, wherein the fine particle collecting means is connected to the means for supplying the fine particle alkaline metal oxide into the fluidized-bed gasification furnace.

21. An incinerator for waste materials according to claim 1, wherein two-stage classification means comprised of a coarse upper-stage sieve and a fine lower-stage sieve is connected to the means for discharging the unburned materials from the first fluidized bed, an upper side of the upper-stage sieve and an upper side of the lower-stage sieve are connected to an unburned material removing means and the fluidizing medium circulating means, respectively, and the fluidizing medium circulating means is connected to the fluidized-bed gasification furnace.

22. An incinerator for waste materials according to claim 21, wherein the fluidizing medium circulating means is provided with water adding means for washing and removing chloride fine particles and ash in the fluidizing medium to form a washing means.

23. An incinerator for waste materials according to claim 1, further comprising dust collecting means for separating and removing dust including chlorides provided between the fluidized-bed gasification furnace and the fluidized bed combustion furnace.

24. An incinerator for waste materials according to claim 1, wherein the fluidized-bed gasification furnace is provided with desalting-agent supply means.

25. An incinerator for waste materials according to claim 1, wherein the means for discharging the unburned material from the first fluidized bed is connected to the fluidized-bed gasification furnace through classification means and chloride removing means.

26. An incinerator for waste materials including chlorine compounds, comprising:
a fluidized-bed gasification furnace including a first fluidized bed made of at least a fluidizing medium of an alkaline metal oxide, means for supplying air into said first fluidized bed, means for supplying waste materials including chlorine compounds, and means for discharging unburned materials in the waste materials out of said first fluidized bed, whereby the waste materials are gasified in the first fluidized bed and generated hydrogen chloride is changed into a salt; and
a fluidized-bed combustion furnace connected to the downstream side of said gasification furnace so as to receive gases produced in the gasification furnace and having a second fluidized bed for burning said gases;
wherein said means for discharging unburned materials discharges at least a major amount of said salt out of said fluidized-bed gasification furnace and away from said fluidized-bed combustion furnace.

27. An incinerator for waste materials including chlorine compounds, comprising:
a fluidized-bed gasification furnace including a first fluidized bed made of at least a fluidizing medium of quick lime, means for supplying air into said first fluidized bed, means for supplying waste materials including chlorine compounds, and means for discharging unburned materials in the waste materials out of said first fluidized bed, whereby the waste materials are gasified in the first fluidized bed and generated hydrogen chloride is changed into a salt; and
a fluidized-bed combustion furnace connected to the downstream side of said gasification furnace so as to receive gases produced in the gasification furnace and having a second fluidized bed for burning said gases.

* * * * *